A. LOOMIS.
MOTOR VEHICLE.
APPLICATION FILED NOV. 7, 1912.
1,148,697.
Patented Aug. 3, 1915.
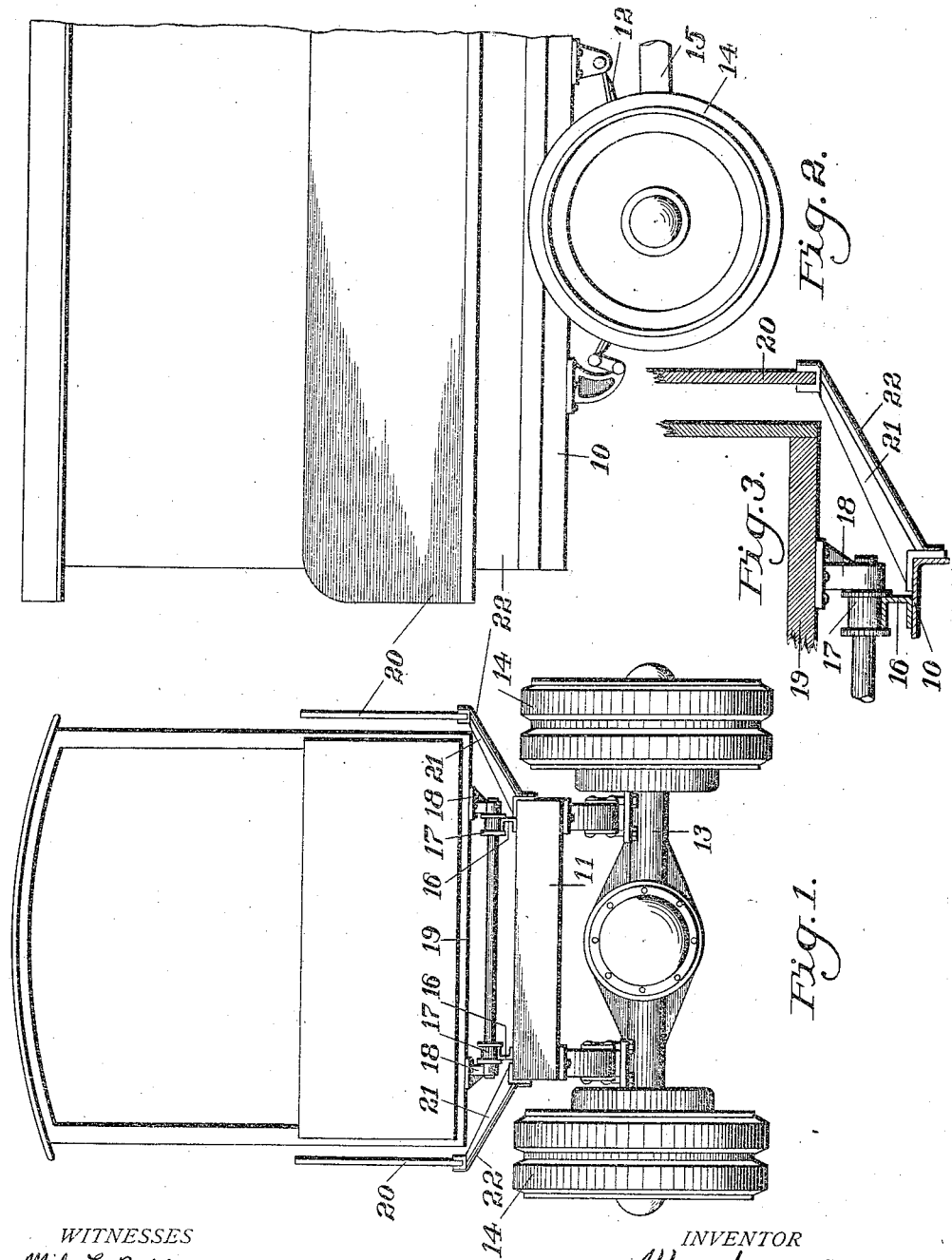
WITNESSES
Milo L. Bailey.
INVENTOR
Allen Loomis
by Milton Tibbetts,
Attorney

UNITED STATES PATENT OFFICE.

ALLEN LOOMIS, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,148,697.     Specification of Letters Patent.     Patented Aug. 3, 1915.

Application filed November 7, 1912. Serial No. 730,052.

*To all whom it may concern:*

Be it known that I, ALLEN LOOMIS, a citizen of the United States, and resident of Detroit, Wayne county, State of Michigan, have invented certain new and useful Improvements in Motor-Vehicles, of which the following is a specification.

This invention relates to motor vehicles, and particularly to commercial motor vehicles.

In commercial vehicles heretofore, it has been customary to have the side panels and sometimes other parts of the body decorated with the name of the firm or company operating the vehicle and with other advertising matter.

With the development of the motor truck business has come the need for interchangeable bodies, so that various types of bodies can be used on a single chassis and so that two or more bodies of the same kind may be used alternately on a single chassis, one of them being loaded while the other is in operation on the frame.

One of the objects of the present invention is to provide a vehicle, preferably of the commercial type, with side panels supported from the frame or chassis independently of the body, for use particularly where the body is removable. Thus several bodies may be provided for a single chassis and only one set of signs or sign panels will be necessary, thus reducing to a considerable extent the cost of signs and sign panels, and placing the signs permanently on the chassis, where they are not so likely to be injured as they would be were they arranged on the sides of the bodies.

Another object of the invention is to provide a commercial vehicle with a body removable endwise and with side panels supported from the frame of the vehicle independently of the body.

Another object of the invention is to provide a vehicle with side panels and mud guards supported independently of the vehicle body.

Other objects of the invetion will appear from the following description, taken in connection with the drawings which form a part of this specification, and in which—

Figure 1 is a rear view of a vehicle built in accordance with this invention; Fig. 2 is a side elevation; and Fig. 3 is an enlarged transverse sectional view showing details of construction.

In the drawings, the frame of the chassis comprises side members 10 and cross members 11, of which there may be several, which frame is supported on springs 12 above the axle 13. Suitable traction wheels 14 and driving shaft 15 are provided.

Mounted directly upon the side members 10 is a pair of rails 16 constituting a track, upon which flanged rollers 17 may operate. These flanged rollers are trunnioned in brackets 18, secured to the bottom of the body 19; this body being of any suitable construction, but shown as a body of the inclosed type, suitable for moving furniture or other comparatively light merchandise.

With the above arrangement of removable body, it will be understood that each chassis may be provided with two bodies, one of which may be unloaded and loaded again while the other is in use on the chassis, and in this way considerable time saved and the chassis kept in operation practically continuously.

In order to obviate providing each or all of the bodies with signs of the owner of the vehicle, a pair of side panels 20 of any suitable form or construction may be mounted upon brackets 21, which are supported directly upon the side members 10, as shown particularly in Fig. 3. These sign panels may, if desired, cover the entire side of the vehicle body, or they may extend partway up the side, as shown in the drawings, depending upon the amount of advertising matter the owner wishes to display.

It will be understood that several brackets 21 may be provided on each side of the vehicle, the number depending upon the size and position of the panels 20, and secured to these brackets is a sheet metal or other plate 22, which entirely fills in the space between the frame member 10 and the panel 20, thus forming a mud guard for the body and its support.

It will be understood that various modifications of the invention may be made without departing from the spirit thereof.

Having thus described my invention, what I claim and desire to secure by Letters Patent, is—

1. In a motor vehicle, the combination with the frame, and a body removably supported thereon, of a sign panel arranged at the side of the body and outboard therefrom to clear the body as the latter is being removed, and means independent of the body for supporting the panel from the frame.

2. In a motor vehicle, the combination with the frame and a body supported thereon and adapted to be removed therefrom longitudinally of the vehicle, of panels arranged at the sides of the body and outboard therefrom, and means for supporting the panels from the frame independently of the body.

3. In a motor vehicle, the combination with the frame, the body, and roller connections between the frame and body whereby the latter may be moved endwise on the frame, of sign panels arranged longitudinally at the sides of the body and spaced therefrom to permit the body to slide relatively to them, and brackets projecting from the frame and supporting the panels independently of the body and connections.

In testimony whereof I affix my signature in the presence of two witnesses.

ALLEN LOOMIS.

Witnesses:
ALFRED H. KNIGHT,
R. M. HIDEY.